United States Patent
Chandel et al.

(10) Patent No.: US 12,111,982 B2
(45) Date of Patent: Oct. 8, 2024

(54) SYSTEMS AND METHODS FOR REAL-TIME TRACKING OF TRAJECTORIES USING MOTION SENSORS

(71) Applicant: Tata Consultancy Services Limited, Mumbai (IN)

(72) Inventors: Vivek Chandel, Noida (IN); Avik Ghose, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/465,409

(22) Filed: Sep. 12, 2023

(65) Prior Publication Data

US 2024/0160297 A1    May 16, 2024

(30) Foreign Application Priority Data

Nov. 4, 2022   (IN) .............................. 202221063147

(51) Int. Cl.
- G06F 3/0346   (2013.01)
- G06F 1/16     (2006.01)
- G06F 3/01     (2006.01)

(52) U.S. Cl.
CPC ............ G06F 3/0346 (2013.01); G06F 1/163 (2013.01); G06F 3/014 (2013.01)

(58) Field of Classification Search
CPC ........ G06F 3/0346; G06F 1/163; G06F 3/014; G06F 1/1694; G06F 3/04883; G06N 3/09; G06N 3/0464; G06V 40/28
See application file for complete search history.

(56) References Cited

U.S. PATENT DOCUMENTS

| | | | |
|---|---|---|---|
| 10,101,793 B2 * | 10/2018 | Tu | G06F 1/163 |
| 10,218,882 B2 * | 2/2019 | Shotton | G06T 7/20 |

(Continued)

FOREIGN PATENT DOCUMENTS

| | | |
|---|---|---|
| CN | 113052172 A | 6/2021 |
| KR | 20160124779 A | 10/2016 |

OTHER PUBLICATIONS

Shahram Mohammadi et al., "Air-writing recognition system for Persian Nos. with a novel classifier," Springer Nature 2019, 2019, Springer-Verlag GmbH, https://www.researchgate.net/publication/333888771_Air-writing_recognition_system_for_Persian_numbers_with_a_novel_classifier.

(Continued)

*Primary Examiner* — Ibrahim A Khan
(74) *Attorney, Agent, or Firm* — FINNEGAN, HENDERSON, FARABOW, GARRETT & DUNNER, LLP

(57) ABSTRACT

Tracking motion using inertial sensors embedded in commercial grade wearables like smartwatches has proved to be a challenging task, especially if real-time tracking is a requirement. Present disclosure provides system and method wherein data from sensors are obtained and scaled. Further, Euler Rodrigues Matrix (ERM) is generated based delta value obtained using sensor data. The scaled sensor data and ERM are used for generating feature vectors. Windowing technique is applied for subsets of feature vectors to obtain label for each window and machine learning model is trained with the label and window. Further, during real-time, sensor data is obtained, and steps of ERM, feature vectors generation, and application of windowing technique are repeated, and coordinates are estimated for each window in real-time based on which trajectories are tracked in real-time for each window.

15 Claims, 6 Drawing Sheets

(56) References Cited

U.S. PATENT DOCUMENTS

| | | | | |
|---|---|---|---|---|
| 10,300,370 | B1* | 5/2019 | Amihood | G06N 20/00 |
| 10,386,481 | B1* | 8/2019 | Chen | G01S 3/8083 |
| 10,802,600 | B1* | 10/2020 | Ravasz | G06F 3/013 |
| 11,157,086 | B2* | 10/2021 | Cipoletta | H04W 4/021 |
| 11,822,732 | B1* | 11/2023 | Zhu | G06F 3/033 |
| 2016/0364010 | A1* | 12/2016 | Amma | G06V 30/228 |
| 2019/0026001 | A1* | 1/2019 | Hebbalaguppe | G06T 7/70 |
| 2019/0196600 | A1* | 6/2019 | Rothberg | G06V 40/20 |
| 2020/0104999 | A1* | 4/2020 | Edell | G06V 40/161 |
| 2020/0201443 | A1* | 6/2020 | Huang | G06N 20/20 |
| 2020/0272813 | A1* | 8/2020 | Hebbalaguppe | G06V 10/764 |
| 2020/0310541 | A1* | 10/2020 | Reisman | G06V 40/28 |
| 2020/0409481 | A1* | 12/2020 | Henrikson | G06F 3/013 |
| 2021/0124417 | A1* | 4/2021 | Ma | G06F 3/015 |
| 2022/0203996 | A1* | 6/2022 | Katz | B60W 50/14 |
| 2023/0072423 | A1* | 3/2023 | Osborn | G16H 20/30 |
| 2023/0139626 | A1* | 5/2023 | Berliner | G06F 1/1694 |
| | | | | 345/156 |
| 2023/0141680 | A1* | 5/2023 | Asgekar | G06V 40/28 |
| | | | | 345/156 |
| 2023/0154032 | A1* | 5/2023 | Sinha | G06V 10/62 |
| | | | | 382/103 |
| 2023/0305644 | A1* | 9/2023 | Cody | G06F 3/04883 |
| 2024/0146350 | A1* | 5/2024 | Grétarsson | H04B 1/385 |

OTHER PUBLICATIONS

Hongyu Zhang et al., "A Wearable Real-Time Character Recognition System Based on Edge Computing-Enabled Deep Learning for Air-Writing," Journal of Sensors, 2022, Hindawi Link: https://www.hindawi.com/journals/js/2022/8507706/.

Junaid Younas et al., "Finger AirWriting—Movement Reconstruction with Low-cost IMU Sensor Title of the item: MobiQuitous '20," 2020, Association for Computing Machinery, https://www.researchgate.net/publication/353800761_Finger_Air_Writing_-Movement_Reconstruction_with_Low-cost_IMU_Sensor.

* cited by examiner

SYSTEMS AND METHODS FOR REAL-TIME TRACKING OF TRAJECTORIES USING MOTION SENSORS

PRIORITY CLAIM

This U.S. patent application claims priority under 35 U.S.C. § 119 to: Indian Patent Application No. 202221063147, filed on Nov. 4, 2022. The entire contents of the aforementioned application are incorporated herein by reference.

TECHNICAL FIELD

The disclosure herein generally relates to real-time tracking, and, more particularly, to systems and methods for real-time tracking of trajectories using motion sensors.

BACKGROUND

Tracking motion using inertial sensors embedded in commercial grade wearables like smartwatches has proved to be a challenging task, especially if real-time tracking is a requirement. Although various approaches have been presented over time, specializing in one or more usage scenarios, either they require additional sensing modality affecting the ubiquity of the solution, and/or are not efficient enough for real-time tracking, especially on low-power embedded devices with limited computing capabilities. In addition, tracking while the user is on the move, e.g., walking, adds up to the challenges.

SUMMARY

Embodiments of the present disclosure present technological improvements as solutions to one or more of the above-mentioned technical problems recognized by the inventors in conventional systems.

For example, in one aspect, there is provided a processor implemented method for real-time tracking of trajectories using motion sensors. The method comprises acquiring, via one or more hardware processors, a first sensor data and a second sensor data from a first sensor and a second sensor respectively, wherein the first sensor data and the second sensor data are associated with a user; converting, via the one or more hardware processors, the first sensor data and the second sensor data into a first set of scaled sensor data and a second set of scaled sensor data; calculating, via the one or more hardware processors, a delta value in a plurality of axis for each sensor value from the second sensor data based on a duration between a current sensor value and a previous sensor value; generating, via the one or more hardware processors, a Euler Rodriguez matrix based on the calculated delta value in the plurality of axis for each sensor value from the second sensor data; generating, via the one or more hardware processors, a plurality of feature vectors based on the first set of scaled sensor data, the second set of scaled sensor data, and the Euler Rodriguez matrix; applying, via the one or more hardware processors, a windowing technique comprising a pre-defined window size on each of the plurality of feature vectors to obtain a plurality of windows, wherein each window amongst the plurality of windows comprises one or more associated feature vectors amongst the plurality of feature vectors; and training, via the one or more hardware processors, one or more machine learning (ML) models based on a label annotated to each window amongst the plurality of windows, wherein the label indicates a stroke direction of data comprised in each window.

In an embodiment, the method further comprises continually acquiring in real-time, via the one or more hardware processors, a first test sensor data and a second test sensor data from the first sensor and the second sensor respectively, wherein the first test sensor data and the second test sensor data are associated with a user; converting in real-time, via the one or more hardware processors, the first test sensor data and the second test sensor data into a first set of scaled test sensor data and a second set of scaled test sensor data; calculating in real-time, via the one or more hardware processors, a test delta value in the plurality of axis for each sensor value from the second test sensor data based on a duration between a current sensor value and a previous sensor value; generating in real-time, via the one or more hardware processors, the Euler Rodriguez matrix based on the calculated test delta value in the plurality of axis for each sensor value from the second test sensor data; obtaining in real-time, via the one or more hardware processors, a set of feature vectors based on the first set of scaled test sensor data, the second set of scaled test sensor data, and the Euler Rodriguez matrix; and iteratively performing, for each subset of feature vectors until a last subset feature vectors amongst the set of feature vectors: applying in real-time, via the one or more hardware processors, the windowing technique on a current subset of feature vectors amongst the set of feature vectors to obtain a current window; identifying in real-time, by using the one or more trained machine learning (ML) models via the one or more hardware processors, an associated label for the current window; calculating in real-time, via the one or more hardware processors, a set of coordinates for the current window based on the associated label, and one or more coordinates associated with a previous window; and tracking in real-time, via the trained ML models, a trajectory for the current window based on the set of coordinates of the current window.

In an embodiment, the user is in at least one of a first position, and a second position.

In an embodiment, the first sensor data and the second sensor data are scaled between a first associated pre-defined threshold and a second associated pre-defined threshold to obtain the first set of scaled sensor data and the second set of scaled sensor data.

In an embodiment, a set of pre-defined initial coordinates are associated with a first window prior to applying the window technique or during application of the windowing technique.

In another aspect, there is provided a processor implemented system for real-time tracking of trajectories using motion sensors. The system comprises: a memory storing instructions; one or more communication interfaces; and one or more hardware processors coupled to the memory via the one or more communication interfaces, wherein the one or more hardware processors are configured by the instructions to: acquire a first sensor data and a second sensor data from a first sensor and a second sensor respectively, wherein the first sensor data and the second sensor data are associated with a user; convert the first sensor data and the second sensor data into a first set of scaled sensor data and a second set of scaled sensor data; calculate a delta value in a plurality of axis for each sensor value from the second sensor data based on a duration between a current sensor value and a previous sensor value; generate a Euler Rodriguez matrix based on the calculated delta value in the plurality of axis for each sensor value from the second sensor data; generate a plurality of feature vectors based on the first set of scaled sensor data, the second set of scaled sensor data, and the Euler Rodriguez matrix; apply a windowing technique comprising a pre-defined window size on each of the plurality of feature vectors to obtain a plurality of windows, wherein each window amongst the plurality of windows comprises one or more associated feature vectors amongst the plurality of feature vectors; and train one or more machine learning (ML) models based on a label annotated to each window amongst the plurality of windows, wherein the label indicates a stroke direction of data comprised in each window.

In an embodiment, the one or more hardware processors are further configured by the instructions to continually acquire in real-time, a first test sensor data and a second test sensor data from the first sensor and the second sensor respectively, wherein the first test sensor data and the second test sensor data are associated with a user; convert in real-time, the first test sensor data and the second test sensor data into a first set of scaled test sensor data and a second set of scaled test sensor data; calculate in real-time, a test delta value in the plurality of axis for each sensor value from the second test sensor data based on a duration between a current sensor value and a previous sensor value; generate in real-time, the Euler Rodriguez matrix based on the calculated test delta value in the plurality of axis for each sensor value from the second test sensor data; obtain in real-time, a set of feature vectors based on the first set of scaled test sensor data, the second set of scaled test sensor data, and the Euler Rodriguez matrix; and iteratively perform, for each subset of feature vectors until a last subset feature vectors amongst the set of feature vectors: applying in real-time, the windowing technique on a current subset of feature vectors amongst the set of feature vectors to obtain a current window; identifying in real-time, by using the one or more trained machine learning (ML) models, an associated label for the current window; calculating in real-time, a set of coordinates for the current window based on the associated label, and one or more coordinates associated with a previous window; and tracking in real-time, via the one or more trained ML models, a trajectory for the current window based on the set of coordinates of the current window.

In an embodiment, the user is in at least one of a first position, and a second position.

In an embodiment, the first sensor data and the second sensor data are scaled between a first associated pre-defined threshold and a second associated pre-defined threshold to obtain the first set of scaled sensor data and the second set of scaled sensor data.

In an embodiment, a set of pre-defined initial coordinates are associated with a first window prior to applying the window technique or during application of the windowing technique.

In yet another aspect, there are provided one or more non-transitory machine-readable information storage mediums comprising one or more instructions which when executed by one or more hardware processors cause real-time tracking of trajectories using motion sensors by acquiring a first sensor data and a second sensor data from a first sensor and a second sensor respectively, wherein the first sensor data and the second sensor data are associated with a user; converting the first sensor data and the second sensor data into a first set of scaled sensor data and a second set of scaled sensor data; calculating a delta value in a plurality of axis for each sensor value from the second sensor data based on a duration between a current sensor value and a previous sensor value; generating a Euler Rodriguez matrix based on the calculated delta value in the plurality of axis for each sensor value from the second sensor data; generating a plurality of feature vectors based on the first set of scaled sensor data, the second set of scaled sensor data, and the Euler Rodriguez matrix; applying a windowing technique comprising a pre-defined window size on each of the plurality of feature vectors to obtain a plurality of windows, wherein each window amongst the plurality of windows comprises one or more associated feature vectors amongst the plurality of feature vectors; and training one or more machine learning (ML) models based on a label annotated to each window amongst the plurality of windows, wherein the label indicates a stroke direction of data comprised in each window.

In an embodiment, the one or more instructions which when executed by the one or more hardware processors further cause continually acquiring in real-time a first test sensor data and a second test sensor data from the first sensor and the second sensor respectively, wherein the first test sensor data and the second test sensor data are associated with a user; converting in real-time, the first test sensor data and the second test sensor data into a first set of scaled test sensor data and a second set of scaled test sensor data; calculating in real-time, a test delta value in the plurality of axis for each sensor value from the second test sensor data based on a duration between a current sensor value and a previous sensor value; generating in real-time, the Euler Rodriguez matrix based on the calculated test delta value in the plurality of axis for each sensor value from the second test sensor data; obtaining in real-time, a set of feature vectors based on the first set of scaled test sensor data, the second set of scaled test sensor data, and the Euler Rodriguez matrix; and iteratively performing, for each subset of feature vectors until a last subset feature vectors amongst the set of feature vectors: applying in real-time, the windowing technique on a current subset of feature vectors amongst the set of feature vectors to obtain a current window; identifying in real-time, by using the one or more trained machine learning (ML) models an associated label for the current window; calculating in real-time, a set of coordinates for the current window based on the associated label, and one or more coordinates associated with a previous window; and tracking in real-time, via the one or more trained ML models, a trajectory for the current window based on the set of coordinates of the current window.

In an embodiment, the user is in at least one of a first position, and a second position.

In an embodiment, the first sensor data and the second sensor data are scaled between a first associated pre-defined threshold and a second associated pre-defined threshold to obtain the first set of scaled sensor data and the second set of scaled sensor data.

In an embodiment, a set of pre-defined initial coordinates are associated with a first window prior to applying the window technique or during application of the windowing technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
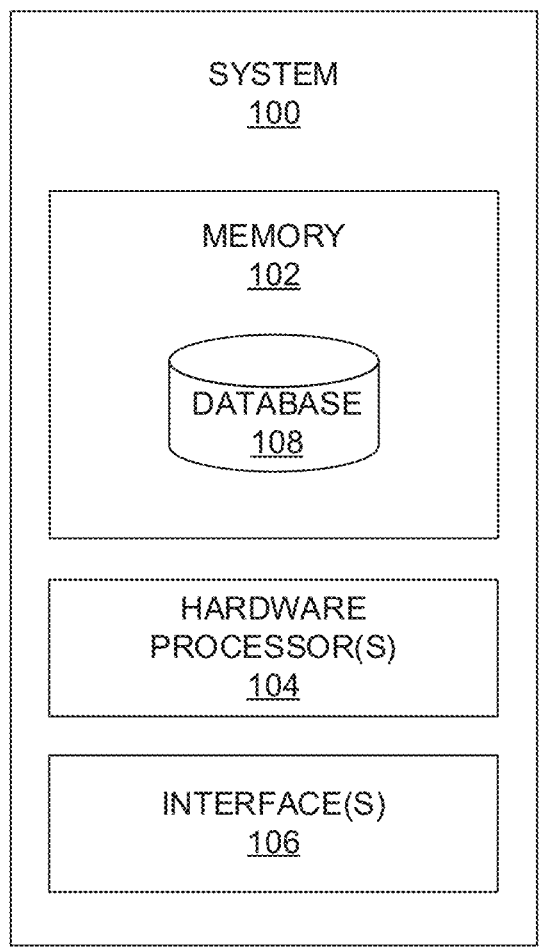
FIG. 1 depicts an exemplary system for real-time tracking of trajectories using motion sensors, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As mentioned, tracking motion using inertial sensors embedded in commercial grade wearables like smartwatches has proved to be a challenging task, especially if real-time tracking is a requirement. Although various approaches have been presented over time, specializing in one or more usage scenarios, either they require additional sensing modality affecting the ubiquity of the solution, and/or are not efficient enough for real-time tracking, especially on low-power embedded devices with limited computing capabilities. In addition, tracking while the user is on the move, e.g., walking, adds up to the challenges.

Present disclosure addresses these issues, with the method and system focusing on air-writing tasks and brings the domain solutioning closer to practicality. Sensor data from wearable device is used to train a machine learning model which learns multi-direction straight line movement patterns of arm, providing multi-directional inferences while air-writing irrespective of plane of writing around the user, effecting a real-time trajectory output. Data from sensors are obtained in real-time and scaled. Further, Euler Rodrigues Matrix (ERM) is generated based delta value obtained using sensor data. The scaled sensor data and ERM are used for generating feature vectors. Windowing technique is applied for subsets of feature vectors to obtain label for each window and machine learning model is trained with the label and window. Further, during real-time, sensor data is obtained, and coordinates are estimated for each window in real-time based on which trajectories are tracked in real-time for each window Imagine yourself jogging, taking a walk, or travelling in your car and being able to control your music, interact with car systems or your smart home in real-time. All the above-mentioned activities/actions are being performed while staying in motion by drawing gesture commands in air, custom-defined by user using just his/her smartwatch. Further, the user is being able to interact with a public computer or Television (TV) by just by moving his/her arm as a pointer input, or any meta-interaction scenario for Augmented Reality (AR)/Mixed Reality (MR) in the wild where using just a wearable can offer high pervasiveness. The present disclosure provides system and method that aim to realize such free-living scenarios using a approach for air-writing, with potential for a robust and real-time arm-tracking in general.

Tracking of human motion has been a subject of deep research since last few decades and holds high interest both from industrial and academic standpoint owing to the interesting challenges, opportunities, and practical use cases it offers.

Whereas tracking lower body movements is of importance, especially in medical and healthcare community for analyzing human gait, monitoring knee/foot injuries, tracking detailed fitness parameters etc., upper body movements have equally garnered attention owing to possibility of a plethora of practical use cases, most of the domains revolving around activity recognition, gesture recognition, air writing for contactless Human Computer Interface (HCI), etc., which involve tracking hand and/or arm motion. Sensor modalities for these solutions vary with most effective solutions involving vision inputs, paired with inputs from inertial sensors, sound, radar, etc. Although showing promising performance, such solutions suffer from impaired pervasiveness owing to their specialized hardware setup.

Today, availability of inertial sensors on commercial wearables, majorly smartwatches has empowered the domain with new possibilities of motion sensing solutions which can be highly ubiquitous owing to widespread acceptance of these devices among the masses. Using inertial sensors alone for accurate tracking comes with well-documented challenges. Existing solutions are largely based on modeling the sensor errors using approaches like Kalman Filtering, which works as an estimator for modeling sensor error and fusing multi-modal sensor data, or stochastic methods like Particle Filter which update a collection of legal states of the tracking system at every data step with accuracy directly dependent on no. of particles. These methods have been proved to robustly resolve sensor errors owing to multiple factors (e.g., temperature, calibration, etc.), and inertial drifting issues to a large extent, while providing 3D tracking. But owing to their high computational requirement for an acceptable accuracy, their utility in a fully real-time system remains questionable, especially for isolated deployments on embedded devices with constrained power of computation. In addition, it is very challenging to track an air-writing motion using these approaches while the user is on the move (e.g., traveling in a car, or walking), primarily owing to dependency on acceleration for gravity inputs, along with a period of pause required to calibrate and initialize the inertial system before performing tracking.

In the domain of gesture recognition using inertial sensors, general pipeline involves a machine learning model trained to classify a pre-defined set of gestures using multiple instances of target gesture data. In contrast, if the system provides the gesture's trajectory itself, it can be matched to a set of target gestures using well-established methods in the domain giving way to a generic gesture recognition featuring ease of (1) deployment with substantially less templates (as low as one), and (2) system scaling to include new gestures easily at user-level itself.

Wrist tracking entails modeling certain elbow-shoulder interactions using a set of angles which in turn are used to decide the attitude and location of wrist. System and method of the present disclosure explore an approach for modeling arm motion. For HCI applications involving air-writing, a motion trajectory can be assumed to be constituted of multiple straight line ministrokes in different directions (similar to 3D chain code used in pattern recognition and vision to represent motion trajectories), which are observed to have distinctive rotational properties. The system and method of the present disclosure build a model for detecting direction of strokes made by the arm in certain fixed directions, which is affected by training a simple and efficient neural network along these directions encompassing motion properties and handling small inter-user variations in writing dynamics. This is similar to a gesture recognition pipeline, but with much smaller decision windows, and instead of processing full gesture data at a time, a decision for a mini stroke is made. In addition, a neural network approach allows us to leverage efficient computational optimizations available today. Also, the decisions are made only on local windows eliminating the possibility of error drift as commonly seen in inertial tracking.

The method and system of the present disclosure provide a substantial factor of practicality to real-life deployments of air-writing applications:
1. Efficient and Real-Time, capable of running tracking algorithm even on embedded hardware with constrained computational power (e.g., contactless HCI) and still provide responsive trajectories in real-time.
2. Robust, capable of estimating motion trajectory even when the user is on the move (walking stairs, light jogging, etc.).
3. Drift free, calibration free, capable of extended time tracking (refer below description on contactless pointing device) while maintaining above two properties without any calibration or inertial initialization for an unobtrusive usage.
4. The system and method of the present disclosure have been evaluated in a variety of use cases (real-time pointing device and generic gesture recognition) and conditions (air-writing while user is in motion) as detailed below.

The present disclosure first tries to establish the dynamics of arm movement while a normal air-writing motion, with a target of identifying discerning features of motion which can then be used for a machine learning task. It has been observed that the rotational characteristics as experienced on wrist when arm is moved along a straight line on a plane (e.g., P1) with rotation happening both at shoulder and elbow, show unique trend along each direction of motion (direction codes 0, 1, 2 . . . as marked on P1, with two adjoining directions being 30° apart). This appears as rotation of wrist along a fixed axis of rotation through the line of motion. To both capture and verify above properties, the system and method use angle-axis equivalent of the gyroscope sensor (interpreted as its quaternion).

During experiments conducted by the present disclosure, stroke in each direction was drawn with arm extending at both starting and ending of the stroke line (boundary of the circular plane P1). It can be deduced from the experimental results that majority of matrix components showed little to no change along a particular straight line on a plane, on either side of the position when wrist crosses center of the plane P1, and that no two strokes pose similar rotational characteristics, reflecting a constant axis of rotation for a particular stroke from one sample to another. This rotational property holds true for every plane around the user within the spherical surface of movement (including P1-P5), since the rotation experienced at the wrist in DCS owing to movement of forearm along the stroke lines in a 2D plane, are independent of the attitude of upper arm with respect to user's torso. This forms the basis of the air-writing dynamics as per the present disclosure.

In practice, in any air-writing motion for a 2D shape (letter, symbol or whole words, etc.) or scenarios like a contactless control of a 2D pointing mechanism, the user writes on a virtual surface in air approximately at a fixed distance from shoulder, with no direct motion happening perpendicular to the direction of writing, or rotation along longitudinal axis of the forearm. Such surfaces are depicted in FIG. 3(c) as D1 and D2. Since it is concluded above that the rotational characteristics of 2D straight line strokes stays the same in every plane around the user, any surface (e.g., D1, D2) can be assumed to be composed of infinite no. of such planes. Hence, these characteristics can be concluded to be valid among each such surface owing to moving elbow as the direction changes, but do not hold for any substantial motion made perpendicular to these surfaces, which can be considered an input for the depth dimension.

With above assumptions, the method of the present disclosure provides 2D embedding of motion trajectory even with the user writing a long continuous stroke, e.g., from left to right or top to bottom with respect to shoulder.

In the above section(s), the present disclosure established the uniqueness in rotational parameters of the forearm while moving wrist along a particular straight line in a plane. A modeling task can be established utilizing this property for every mini stroke in the motion trajectory for inferring direction of the stroke. Usually, every sample from the inertial sensor is passed through a filter/estimator for processing along with information of previous states in order to update the internal model's current state based on the sensor's physics model. System and method of the present disclosure leverage machine learning paradigms in order to determine current location update by considering a set of samples at a time (data window) which are independent of previous data windows.

The present disclosure defines a learning task with input instance as a window of n data samples (10 samples or 0.1 seconds data is preferred as per the experimental results conducted) to enable detection of mini-strokes, which is orders of size smaller than that commonly used for gesture recognition (typically 2-5 seconds). In general, gesture classification tasks employ readings directly from accelerometer and gyroscope as constituent features into their classification models. Direction of stroke is better reflected in the instantaneous axis of rotation $\Phi_i$ in device coordinate system (DCS), than the instantaneous rate of rotation, where the former can be captured in elements of $R_i$ capturing all the interaxis dependencies well while the rotation occurs. Although $R_i$ is a derived property of gyroscope data, but rather than the model learning this behavior in motion on its own, the system of the present disclosure use $e_{jk}^i$, as Euler-Rodriguez features (ERF) as part of the feature set for the ML model training. More specifically, the system and method chose Convolution Neural Network architecture for the trajectory estimation task with 2 convolutional layers followed by fully-connected layers (FIG. 2) capable of running in real-time on low-power embedded devices.

In order to train the model, linear acceleration data from the watch API (available in all major APIs like WearOS, Tizen, iOS with efficient onboard signal processing) to keep the usage orientation independent, and gyroscope data was collected over straight line strokes at different speeds with guiding lines placed vertically on a wall.

The designing task can be posed as a classification task where the model infers the correct stroke class using inertial features from a data window. Since the feature set tracks a continuous motion with the model's output ranging in the interval [0, 2π] radian, the task can also be posed as a regression one where system learns underlying mathematical model relating inertial parameters to the best estimate of stroke angle. Although regression model can provide a slightly smoother output but owing to the discontinuity at the range's edge (2π–0 rad) in training labels, the model behaved erratically there.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 depicts an exemplary system 100 for real-time tracking of trajectories using motion sensors, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information pertaining to sensors (e.g., accelerometer, gyroscope, and the like), data collected from various sensors, scaled sensor data, delta value computed from the gyroscope sensor data, Euler Rodriguez matrix, feature vectors, labels annotated (either by the system 100 or by one or more users such as subject matter experts/domain experts, and the like), associated coordinates obtained during application of window on subset of feature vectors, various trajectories tracked by the system 100 during real-time inference of an action/gesture performed by one or more users, and the like. The database 108 further comprises one or more machine learning (ML) models, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
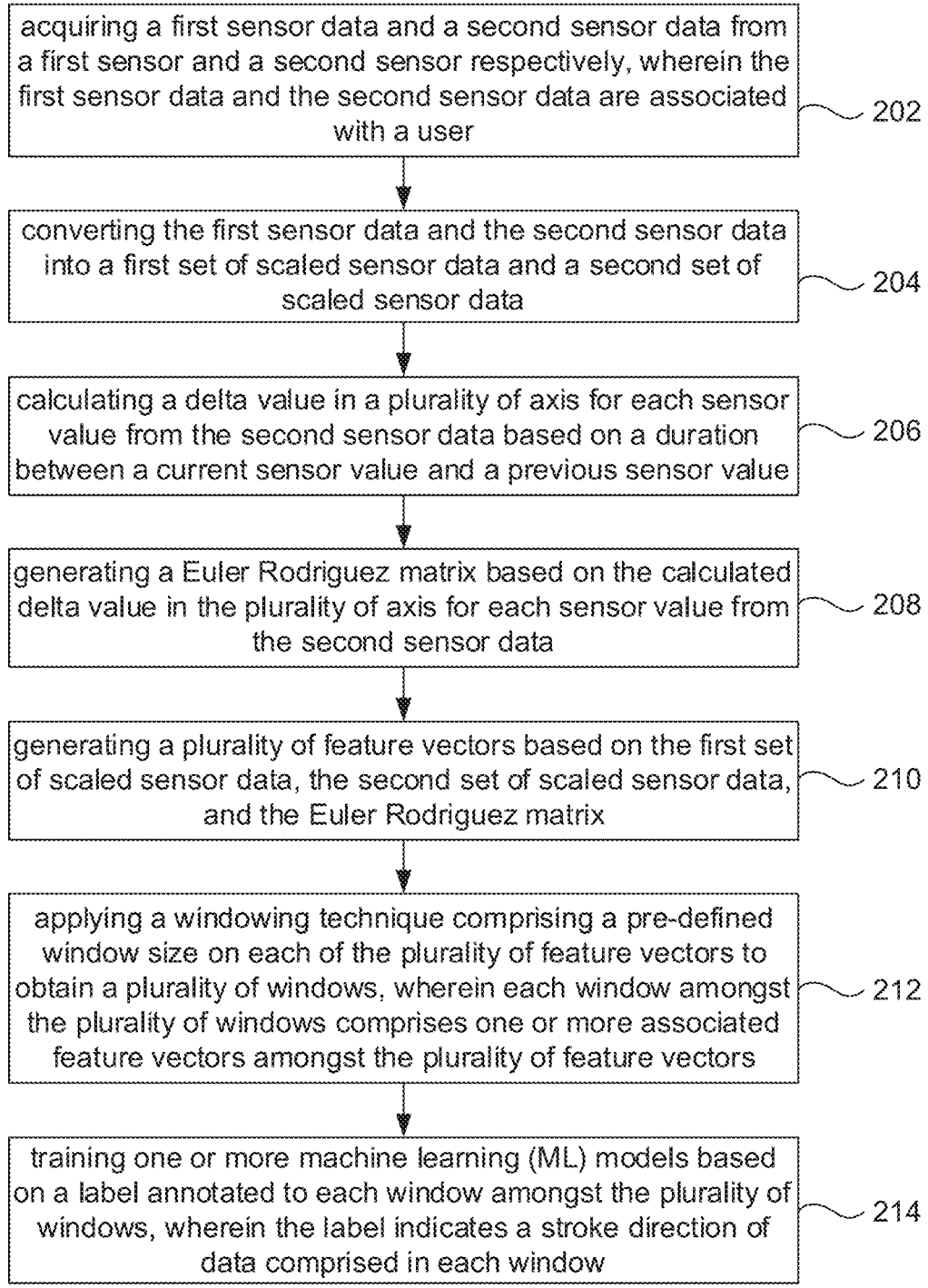
FIG. 2 depicts an exemplary flow chart illustrating a method for training one or more machine learning (ML) models for real-time tracking of trajectories using motion sensors, using the system of FIG. 1, in accordance with an embodiment of the present disclosure.

FIG. 2, with reference to FIG. 1, depicts an exemplary flow chart illustrating a method for training one or more machine learning (ML) models for real-time tracking of trajectories using motion sensors, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and other diagrams as depicted in figures.

At step 202 of the method of the present disclosure, the one or more hardware processors 104 acquire a first sensor data and a second sensor data from a first sensor and a second sensor respectively. The first sensor data and the second sensor data are associated with a user (or one or more users, says users A, B, and so on). In the present disclosure, the first sensor data is accelerometer data, and the second sensor data is a gyroscope data obtained from accelerometer and gyroscope respectively. The accelerometer and gyroscope are configured in a wearable device (e.g., say a smartwatch), in one embodiment of the present disclosure. The accelerometer and gyroscope are also referred to as inertial sensors, motion sensors, and interchangeably used herein. The wearable device is worn by the user. The user is in at least one of a first position and a second position. The first position refers to the user being in a static/standstill position and the second position refers to the user in motion or vice versa. More specifically, in the present disclosure, linear acceleration data from the watch Application Programming Interface (API) (available in all major APIs like WearOS®, Tizen®, iOS® with efficient onboard signal processing) to keep the usage orientation independent, and gyroscope data was collected over straight line strokes at different speeds with guiding lines placed vertically on a wall.

It is to be understood by a person having ordinary skill in the art or person skilled in the art that the system 100 acquires sensor data from inertial sensors including accelerometer and gyroscope from a local device (e.g., smartwatch or any smart device configured with accelerometer and gyroscope), which must be strapped down to the node to be tracked (e.g., a wrist, knee, etc.). Every data sample can be transferred in real time to the system 100 where the actual trajectory processing takes place, which is termed as Remote System. Data sample can be also buffered on the local device and sent as a burst to the system, designed as per the use case demands. Data sample can be also processed for trajectory calculation on the local device itself without any sensor data transfer to a remote system wherein the system 100 is integrated in the local device (e.g., wearable device), and the local device can run the machine learning inferences on itself for calculating motion trajectory.

At step 204 of the method of the present disclosure, the one or more hardware processors 104 convert the first sensor data and the second sensor data into a first set of scaled sensor data and a second set of scaled sensor data. The first sensor data and the second sensor data are scaled between a first associated pre-defined threshold and a second associated pre-defined threshold to obtain the first set of scaled sensor data and the second set of scaled sensor data.

Let $i^{th}$ accelerometer data sample (also referred as accelerometer data/first sensor data) be defined as a collection of 3-axis data as $a_i^x$, $a_i^y$, and $a_i^z$ for acceleration in X, Y and Z axis of the local device respectively. Similarly, let $i^{th}$ gyroscope data sample (also referred as gyroscope data/second sensor data) be defined as a collection of 3-axis data as $g_i^x$, $g_i^y$, and $g_i^z$ for rate of rotation around X, Y and Z axis of the local device respectively. The present disclosure first tries to establish the dynamics of arm movement while a normal air-writing motion, with a target of identifying discerning features of motion which can then be used for a machine learning task. It has been observed that the rotational characteristics as experienced on wrist when arm is moved along a straight line on a plane (e.g., P1) with rotation happening both at shoulder and elbow, show unique trend along each direction of motion (direction codes 0, 1, 2 . . . as marked on P1, with two adjoining directions being 30° apart). This appears as rotation of wrist along a fixed axis of rotation through the line of motion. To both capture and verify above properties, the system and method use angle-axis equivalent of the gyroscope sensor (interpreted as its quaternion).

The local device's rotation from $(i-1)^{th}$ to $i^{th}$ sample (dT seconds apart) can be expressed in the form of a single compound rotation along a fixed axis, provided the rotation is infinitesimally small which is an assumption made by the system 100 at a sampling rate of 100 Hertz which is the operating rate. It is to be understood by a person having ordinary skill in the art or person skilled in the art that accelerometer data sample is referred as accelerometer sample or first sensor data and interchangeably used herein. It is to be understood by a person having ordinary skill in the art or person skilled in the art that gyroscope data sample may be referred to as gyroscope sample or the second sensor data and interchangeably used herein.

Accelerometer samples may be scaled between a fixed range: $A_{min}$ (e.g., the first associated pre-defined threshold) and $A_{max}$ (e.g., the second associated pre-defined threshold). Scaled value for X axis accelerometer sample can be calculated as follows:

$$a_i^{xs} = \frac{a_i^x - A_{min}}{A_{max} - A_{min}}, a_i^{ys} = \frac{a_i^y - A_{min}}{A_{max} - A_{min}}, a_i^{zs} = \frac{a_i^z - A_{min}}{A_{max} - A_{min}}$$

For an implementation involving human motion tracking of arm, a limit of $-10$ m/s$^2$ to $10$ m/s$^2$ can be used to affect the maximum value of acceleration between 1 to 2 for body acceleration experienced at arm while doing common tasks. Similar scaling values can be used for any other node to be tracked by keeping in mind their usage scenario. Gyroscope samples may be scaled between a fixed range: $G_{min}$ (e.g., the first associated pre-defined threshold) and $G_{max}$ (e.g., the second associated pre-defined threshold). Scaled value for X axis sample can be calculated as follows:

$$g_i^{xs} = \frac{g_i^x - G_{min}}{G_{max} - G_{min}}, g_i^{ys} = \frac{g_i^y - G_{min}}{G_{max} - G_{min}}, g_i^{zs} = \frac{g_i^z - G_{min}}{G_{max} - G_{min}}.$$

Referring to steps of FIG. 2, at step 206 of the method of the present disclosure, the one or more hardware processors 104 calculate a delta value in a plurality of axis for each sensor value from the second sensor data based on a duration between a current sensor value and a previous sensor value. At step 208 of the method of the present disclosure, the one or more hardware processors 104 generate a Euler Rodriguez matrix based on the calculated delta value in the plurality of axis for each sensor value from the second sensor data. The steps 206 and 208 are better understood by way of following description:

For a straight-line stroke moved by the node in a particular direction, the node can be assumed to have experienced the rotation along approximately a fixed axis of rotation for most of its movement trajectory on that straight line stroke. Hence, a Euler Rodriguez matrix can be derived relating every pair of consecutive data samples from inertial sensors. The X, Y, Z components of delta rotation value (also referred as delta value in a plurality of axis and interchangeably used herein) for sample i is calculated as:

$$r_i^x = \frac{g_i^x + g_{i-1}^x}{2} \cdot dT, r_i^y = \frac{g_i^y + g_{i-1}^y}{2} \cdot dT, r_i^z = \frac{g_i^z + g_{i-1}^z}{2} \cdot dT$$

where dT is duration between a current sensor value and a previous sensor value. In other words, dT is duration between $i^{th}$ and $i+1^{th}$ sample.

Further, a compound rotation is calculated as follows:

$$d\Phi_i = \sqrt{(r_i^x)^2 + (r_i^y)^2 + (r_i^z)^2}.$$

Further, the unit rotational components are calculated as:

$$\Phi_i^x = \frac{r_i^x}{d\Phi_i}, \Phi_i^y = \frac{r_i^y}{d\Phi_i}, \text{ and } \Phi_i^z = \frac{r_i^z}{d\Phi_i}$$

The magnitude of the rotation between samples i and i−1 expressed as $d\theta_i = \|\Phi_i\|$. Let $\Phi_i$ be expressed as $\Phi_i = \Phi_i^x \hat{i} + \Phi_i^y \hat{j} + \Phi_i^z \hat{k}$. A Euler-Rodriguez Matrix (ERM) can then be derived for $d\theta_i$ rotation, relating device's attitude at the two samples:

$$R_i = \begin{bmatrix} c'(\phi_i^x)^2 + c & c'\phi_i^x\phi_i^y - \phi_i^z s & c'\phi_i^x\phi_i^z - \phi_i^y s \\ c'\phi_i^x\phi_i^y + \phi_i^z s & c'(\phi_i^y)^2 + c & c'\phi_i^y\phi_i^z - \phi_i^x s \\ c'\phi_i^x\phi_i^z + \phi_i^y s & c'\phi_i^y\phi_i^z - \phi_i^x s & c'(\phi_i^z)^2 + c \end{bmatrix} \quad (3)$$

where $s = \sin(-d\theta_i)$, $c = \cos(-d\theta_i)$ and $c' = 1-c$. Let $(j^{th}, k^{th})$ element of $R_i$ be expressed as $e_{jk}^i$.

Referring to steps of FIG. 2, at step 210 of the method of the present disclosure, the one or more hardware processors 104 generate a plurality of feature vectors based on the first set of scaled sensor data, the second set of scaled sensor data, and the Euler Rodriguez matrix. For better accuracy of real-time trajectories estimation, the diagonal elements of the Euler Rodriguez matrix are scaled by the system 100, in an embodiment of the present disclosure. In other words, for features of accelerometer (acc), gyroscope (gyro) and ERF (Euler Rodriguez features), the system 100 performs element scaling (ES) operation which is simply unit scaling of each element but within limits fixed for every source (($A_{min}$, $A_{max}$), ($G_{min}$, $G_{max}$), ($r_{min}$, $r_{max}$) for accelerometer, gyroscope, and ERF). For e.g., every element of ERF is normalized as:

$$e^i_{jk} = \frac{e^i_{jk} - r_{min}}{r_{max} - r_{min}}$$

The limit values are deduced from the multi speed-stroke data collected to ensure a similar range for all the sensing sources. It is also noted that owing to extremely small change in rotation from one sample to another, matrix of every ERF is close to identity. Hence, the system 100 performs following additional Diagonal Scaling (DS) operation before element scaling (ES) to allow better capture of rotational features:

$$e^i_{jk} = \begin{cases} e^i_{jk} & j \neq k \\ (1 - e^i_{jk}) \times 100 & j = k \end{cases}$$

Figure 3:
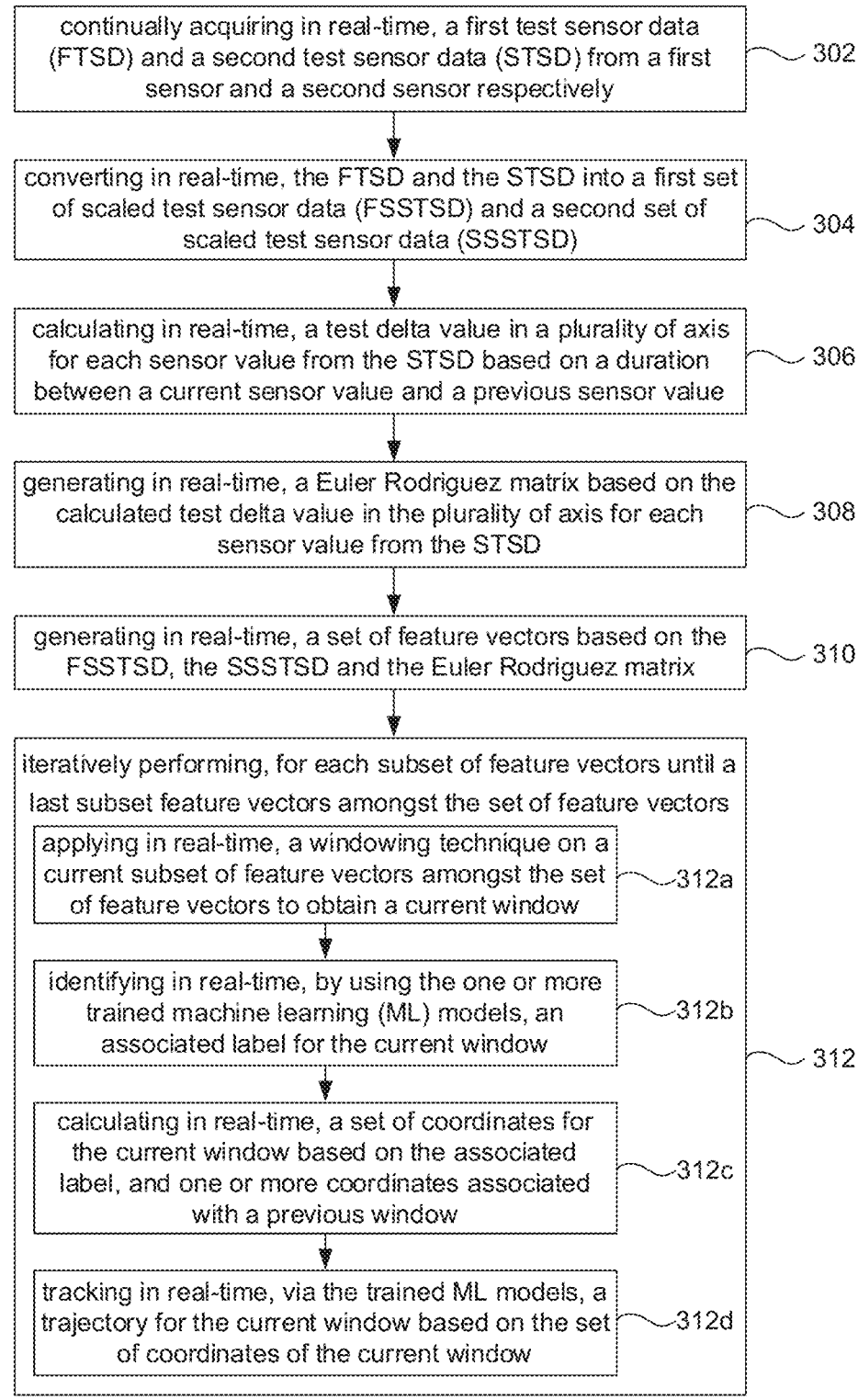
FIG. 3 depicts an exemplary flow chart illustrating a method for real-time tracking of trajectories using motion sensors, via the one or more trained machine learning (ML) models comprised in the system of FIG. 1, in accordance with an embodiment of the present disclosure.
Figure 4:
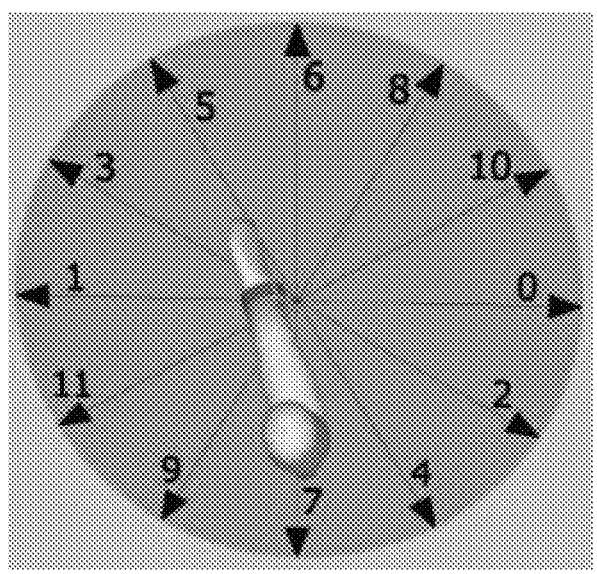
FIG. 4 illustrates sensor data collection while moving an arm in a writing posture along straight lines, in accordance with an embodiment of the present disclosure.

At step 212 of the method of the present disclosure, the one or more hardware processors 104 apply a windowing technique comprising a pre-defined window size on each of the plurality of feature vectors to obtain a plurality of windows. Each window amongst the plurality of windows comprises one or more associated feature vectors amongst the plurality of feature vectors. At step 214 of the method of the present disclosure, the one or more hardware processors 104 train one or more machine learning (ML) models based on a label annotated to each window amongst the plurality of windows. The label indicates a stroke direction of data comprised in each window. In the present disclosure, the stroke direction is a straight-line stroke direction for each window of feature vectors. In other words, the system and method implement the annotating/labeling as the straight-line stroke direction being tracked/estimated for each window of feature vectors. The above steps of 210 till 214 are better understood by way of following description:

As mentioned above, collection of sensor data is in the form of straight-line strokes in different directions of the space of movement of the node to be tracked (for e.g., tracking a wrist while drawing shapes in air). As an implementation, for tracking the wrist motion, sensor data was collected while moving the arm in a writing posture along straight lines as shown in FIG. 3, along with the label for each direction of stroke. This enables the system 100 to provide 2D outputs of the motion trajectories for wrist while drawing in air. FIG. 4, with reference to FIGS. 1 through 3, illustrates sensor data collection while moving an arm in a writing posture along straight lines, in accordance with an embodiment of the present disclosure.

Figure 5:
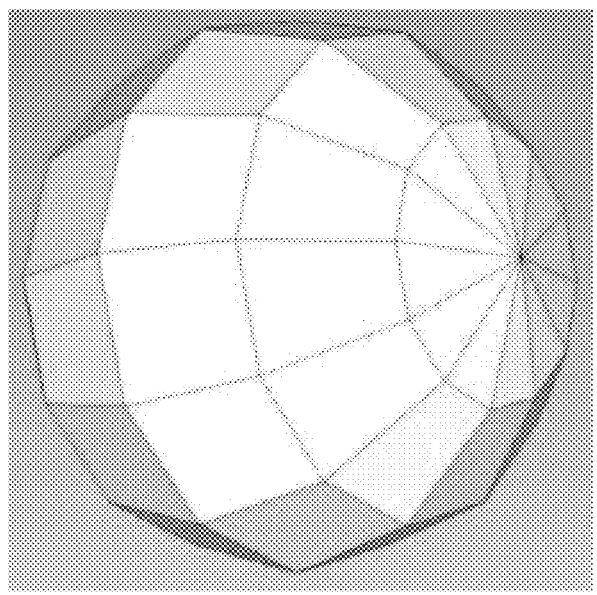
FIG. 5 illustrates training stroke directions for 3D training, in accordance with an embodiment of the present disclosure.
Figure 6:
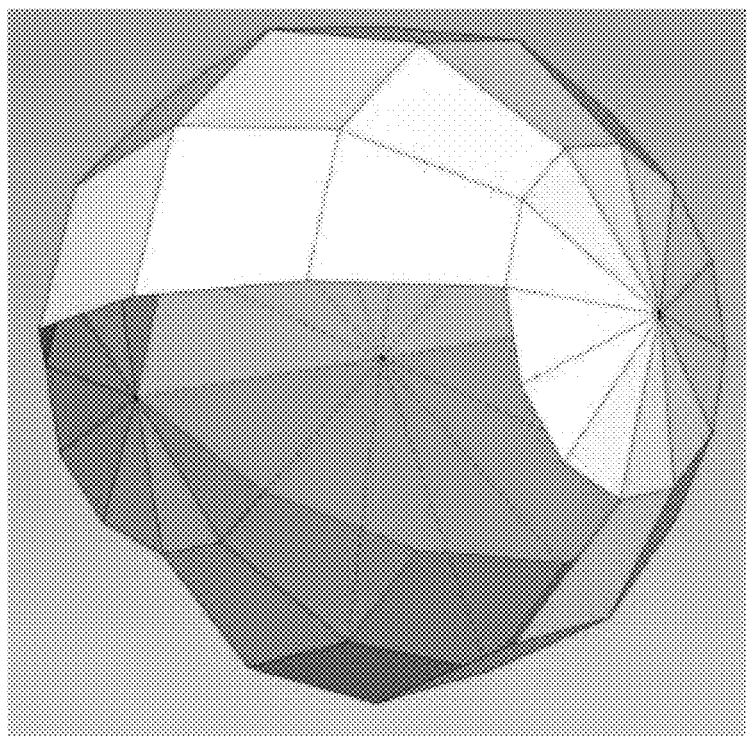
FIG. 6 illustrates training stroke directions for 3D training showing a single plane highlighted inside the 3D sphere with stroke lines, in accordance with an embodiment of the present disclosure.

For 3D tracking, training can be performed along all straight-line strokes covering the spherical space as shown in FIGS. 5 and 6. FIG. 5, with reference to FIGS. 1 through 4, illustrates training stroke directions for 3D training, in accordance with an embodiment of the present disclosure. FIG. 6, with reference to FIGS. 1 through 5, illustrates training stroke directions for 3D training showing a single plane highlighted inside the 3D sphere with stroke lines, in accordance with an embodiment of the present disclosure. In the present disclosure, 12 stroke directions were chosen as pi/6 radians apart for 2D, as shown in FIG. 4.

Multiple stroke instances (of the order of a few hundred) should be collected in every direction of straight lines. As an input to the machine learning model, following feature vector is defined:

$$F_i = \{a_i^{xs}, a_i^{ys}, a_i^{zs}, g_i^{xs}, g_i^{ys}, g_i^{zs}, e_{jk}^i \forall 0 \leq j,k < 3\}$$

This gives a total of 15 features per feature vector, in one embodiment of the present disclosure.

A data window constituting a collection of a predefined number of feature vectors (n) upon applying a windowing technique, can be defined as:

$$W_i = \{F_i, F_{i+1}, F_{i+2}, \ldots, F_{i+n-1}\}$$

Hence $W_i$ is the window which has n feature vectors starting at $i^{th}$ feature vector $F_i$. In the present disclosure, the system 100 and method used a window size of 15 samples for a sampling rate of 100 samples.

A machine learning model can be trained using ($W_i$, $L_i$) as a single training instance, where $L_i$ is the label of the stroke direction which the data of $W_i$ represents. It is noted that ($W_i$, $L_i$) is defined only for certain values of i, which depends on the size of the window, m. If the samples start from index 0, the values that i can take for ($W_i$, $L_i$) are 0, m, 2m, 3m, and so on. In an embodiment, certain feature vectors from one window can be overlapped with the next, in which case the i for an instance ($W_i$, $L_i$) takes values accordingly.

The ML model itself trained to detect different directions of mini strokes for the motion trajectory can be saved in the form of a collection of weights and parameters defining the trained model on a persistent storage medium on whichever device the real time inferences need to be made (local device or the remote system). The machine learning model may be designed using a neural network architecture with two or more 2D convolutional layers, or as per implementation requirement with satisfies conditions for an acceptable accuracy of the performance of the final trained ML model.

Once a machine learning model has been trained to properly infer direction output for every data window $W_i$, it can be used in order to make real time inference and provide a real time trajectory of the moving node (wrist, foot etc.) in real time. FIG. 3, with reference to FIGS. 1-2, depicts an exemplary flow chart illustrating a method for real-time tracking of trajectories using motion sensors, via the one or more trained machine learning (ML) models comprised in the system 100 of FIG. 1, in accordance with an embodiment of the present disclosure. More specifically, during real-time inference the system 100 continually acquires a first test sensor data (FTSD) and a second test sensor data (STSD) from the first sensor and the second sensor respectively in step 302. The first test sensor data (FTSD) and the second test sensor data (STSD) are associated with the user (or one or more users, wherein the one or more users may be either same set of users (e.g., the users A, B, and so on of step 202) from whom sensor data was acquired for training the ML models or a different set of users altogether (e.g., say users U1, U2, and so on). The first test sensor data (FTSD) and the second test sensor data (STSD) are converted in real-time into a first set of scaled test sensor data (FSSTSD) and a second set of scaled test sensor data (SSSTSD) in step 304. Further, a test delta value in the plurality of axis for each sensor value from the second test sensor data (STSD) is calculated in real-time based on a duration between a current sensor value and a previous sensor value in step 306. The Euler Rodriguez matrix (ERM) is generated in real-time based on the calculated test delta value in the plurality of axis for each sensor value from the second test sensor data (STSD) in step 308. Further, a set of feature vectors are obtained in real-time based on the first set of scaled test sensor data (FSSTSD), the second set of scaled test sensor data (SSSTSD), and the Euler Rodriguez matrix (ERM) in step 310. It is to be understood by a person having ordinary skill in the art or person skilled in the art that the steps 302 till 310 of FIG. 3 remain same as that of steps 202 till 210 of FIG. 2. As mentioned above, the diagonal elements of Euler Rodriguez matrix may be scaled during real-time inference for better estimation of trajectories. Further, at step 312 of the method of FIG. 3, the system 100 iteratively performs a series of steps until a last subset of feature vector. The expression 'subset' as used herein refers to at least a few feature vectors from the set of feature vectors generated. For instance, at step 312a, the system 100 applies the windowing technique on a current subset of feature vectors amongst the set of feature vectors to obtain a current window. In step 312b, for the current window, an associated label ($L_i$) is identified in real-time by the one or more trained ML models as mentioned above. A set of coordinates for the current window (e.g., say $2^{nd}$ window) is calculated in real-time based on the associated label, and one or more coordinates associated with a previous window ($1^{st}$ window), at step 312c. Once the coordinates are obtained, the system 100 tracks in real-time, via the one or more trained ML models, a trajectory for the current window based on the set of coordinates of the current window at step 312d. A set of pre-defined initial coordinates (e.g., 0,0) are associated with a first window during application of the windowing technique. In other words, for a first subset of feature vectors, windowing technique is applied with the assumption of coordinates being (0,0). The above steps are repeated until the user continues to perform one or more actions (e.g., a writing posture as mentioned above). It is to be understood by a person having ordinary skill in the art or person skilled in the art that the system 100 may implement machine learning optimizations available today wherein the ML models are leveraged to run the models on hardware(s) with constrained computational power.

For model trained for 2D strokes, as in FIG. 4, the 2D trajectory coordinate update after processing window $W_i$ can be expressed as:

$$x_i = x_{i-n} + \alpha_i \cos(\Theta_{L_i})$$

$$y_i = y_{i-n} + \alpha_i \sin(\Theta_{L_i})$$

where $x_{i-n}$, $y_{i-n}$ are the coordinates calculated after processing the previous data window $W_{i-n}$ (or data of the previous window). $\Theta_{L_i}$ is the angle (in radians) pointed to by the label $L_i$ as estimated by the machine learning model for the current window $W_i$. It is noted that the total compound angle experienced at the wrist over $W_i$ directly gives a measure of translation provided the distance of air-writing plane does not change substantially for a particular writing session. In that case, the translation correction $\alpha_i$ for current window and can be expressed as follows:

$$\alpha_i = \sum_{i}^{i+n-1} d\Phi_i$$

For models trained for straight line strokes in 3D, similar method as above can be applied with every straight-line stroke defined as per every vertex visible in geometry of FIG. 5. The present disclosure provides the system 100 where only one-time training of straight-line strokes is required at the inception. Thereafter, many applications at the user level tracking arm motion can be deployed with unique practical additions. For e.g., a gesture recognition method where the user can draw a simple gesture in air to control their TV, smart home, smart car, music system or any device connected to the same network as the Local Device and the Remote System (as defined before).

For an application, user can add their own custom gesture to be drawn in air to the system 100 by using only one example template, which is possible with the approach of tracking proposed in the present disclosure. In addition, there is no requirement of stationary period or a pause before starting the motion tracking for initialization of inertial sensors, as is common in other motion tracking systems using inertial sensors, owing to the system's/method's usage of data windows independent of each other to calculate the trajectory. In addition, the system 100 designed over the method described herein can even be used while the user is walking, jogging, moving on stairs while drawing anything shape air owing to the kind of features which are used by the machine learning model devised, lending a big factor of practicality (e.g., using gestures in a moving car, or while walking, jogging etc.). Through the method and system of the present disclosure, tracking of arm is shown to be possible on a low-power hardware in real-time using a single wrist wearable to affect many applications on user level without any investment on additional hardware.

Further, Medical applications like monitoring patient's progress in miscellaneous Neuro Musculoskeletal disorders can be performed by leveraging just a wrist wearable and providing patient with certain pre-drawn shapes on screen, and the patient can try to follow those shapes by wearing the wrist wearable, which can very well be a commercial smartwatch (for example).

Another application can be a contactless input to a computer in the form of a pointing device, where the trajectories calculated while moving arm in air in a natural writing posture are converted to the coordinates of pointer movement, and all this is possible using only a single commercial wrist wearable (e.g., a smartwatch). In addition, the system 100 does not require hardware of high computation power since the method/system 100 aims to be deployed in any use case on a hardware with low computational power. In addition, moving full arm in air is a more natural way of interacting with digital devices, rather than using only hand movements or head movements as many of the conventional systems and approaches devise. In addition, such applications can be immensely helpful to reduce physical contact on highly used public touch points, reducing the spread of any contaminants or infections. It is stressed that system and method of the present disclosure can perform tracking not just for rotations around elbow, but the movement of full arm with elbow undergoing rotation/translation, and shoulder undergoing rotation at the same time, using a single wrist wearable capable of running in real time on low-power embedded hardware, enhancing economic factor of the invention. Tracking can be performed, for e.g., when the user is drawing any shape in air in any plane of motion (e.g., left, right, top, bottom with respect to user's shoulder).

The system and method of the present disclosure conducted experimental results for a set of 5 subjects, excluding the subject whose data was used to train the model, to explore user-independence in air-writing modeling. Subjects were given a few minutes to scribble shapes on screen using the system 100 to get acquainted with air-writing posture. The present disclosure used a smart watch, transferring sensor data in real-time over WiFi to a Raspberry Pi 3B where all the pre-processing and inferencing was performed using TFLite framework (e.g., a framework known in the art).

Figure 7:
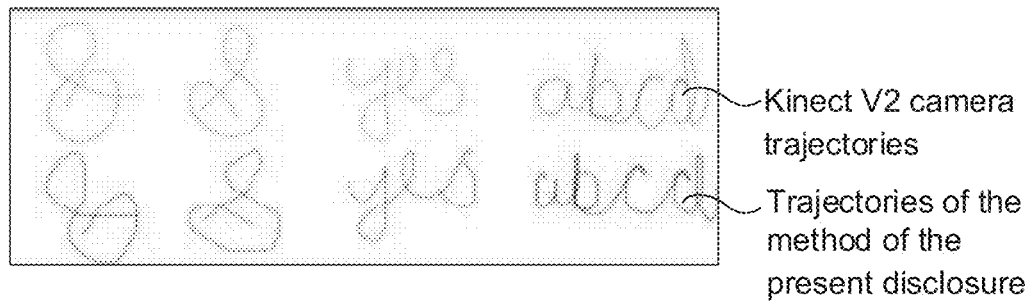
FIG. 7 depicts trajectories derived while user writing in air using the system/method of the present disclosure, and comparison with Kinect V2 camera trajectories (prior art), in accordance with an embodiment of the present disclosure.

For analyzing general ability of trajectory reproduction of the system 100 and method described herein, the present disclosure compared outputs of the method described herein with those generated by Kinect V2 camera for the wrist joint, where subjects wearing smartwatch drew certain shapes/words at varied speeds and in different directions (changing body direction accordingly so that the drawing plane stays in front of the camera). FIG. 7 shows the trajectories generated by Kinect V2 and the system/method of the present disclosure for two of the subjects. It is noted that method/system of the present disclosure can not only track small gestures and shapes but also complete words, which can be really useful for a contact-less and ubiquitous text input.

The method and system of the present disclosure are capable of tracking longer words too when drawn in curved fashion in air as their 2D embeddings (not shown in FIGS.). Although, straight line artifacts are still visible in method's output in FIG. 7 (especially for "abcd") owing to it being trained on straight line strokes, these can be minimized if the system 100 is trained on more directions. Overall, the method/system of the present disclosure was able to reproduce trajectory shapes with good reliability. FIG. 7, with reference to FIGS. 1 through 6, depicts trajectories derived while user writing in air using the system/method of the present disclosure, and comparison with Kinect V2 camera trajectories (prior art), in accordance with an embodiment of the present disclosure.

The system of the present disclosure as a contactless pointing device: One of the key use cases in HCI for air-writing is the ability to digitally control movement of a pointer in a contactless manner. Many research works involving inertial sensors track orientation of hand or head to effect pointer movement on screen. The present disclosure tested the method described herein as a similar pointing solution where the trajectories generated while air-writing are converted directly to screen coordinates, moving the mouse pointer accordingly. ISO standard 9241-411 based on Fitts' law is widely used for quantifying performance of pointing solutions and defines following dependent measure of ID (Index of Difficulty measured in bits) for a certain distance D that the pointer is moved, and W as width of the target within which the pointer is supposed to land:

$$ID = \log_2\left(\frac{D}{W} + 1\right)$$

For multiple experiments, the landing coordinates within one such target area is a scatter, which can be correlated to an altered difficulty level ($ID_e$) and effective target width, $W_e$, which is incorporated in equation below as follows:

$$ID_e = \log_2\left(\frac{D}{W_e} + 1\right)$$

where $W_e$=4.133s, and s is the standard deviation of the landing coordinates within a target area (calculated as per conventional method). Final throughput is then calculated as:

$$TP = \frac{ID_e}{t_m},$$

with $t_m$ as movement time in seconds.

Below Table 1 illustrates results of using the method/system as a contactless pointing device experimented using ISO pointing task (px: pixels, bps: bits per second).

TABLE 1

| D (px) | W (px) | $W_e$ (px) | ID (bits) | Level | $ID_e$ (bits) | $t_m$ (sec) | TP (bps) |
|---|---|---|---|---|---|---|---|
| 1002 | 150 | 135.05 | 2.94 | Very Low | 3.11 | 1.24 | 2.49 |
| 1072 | 80 | 87.62 | 3.85 | Low | 3.73 | 1.52 | 2.46 |
| 1092 | 60 | 68.39 | 4.26 | Medium | 4.09 | 1.71 | 2.39 |

Figure 8:
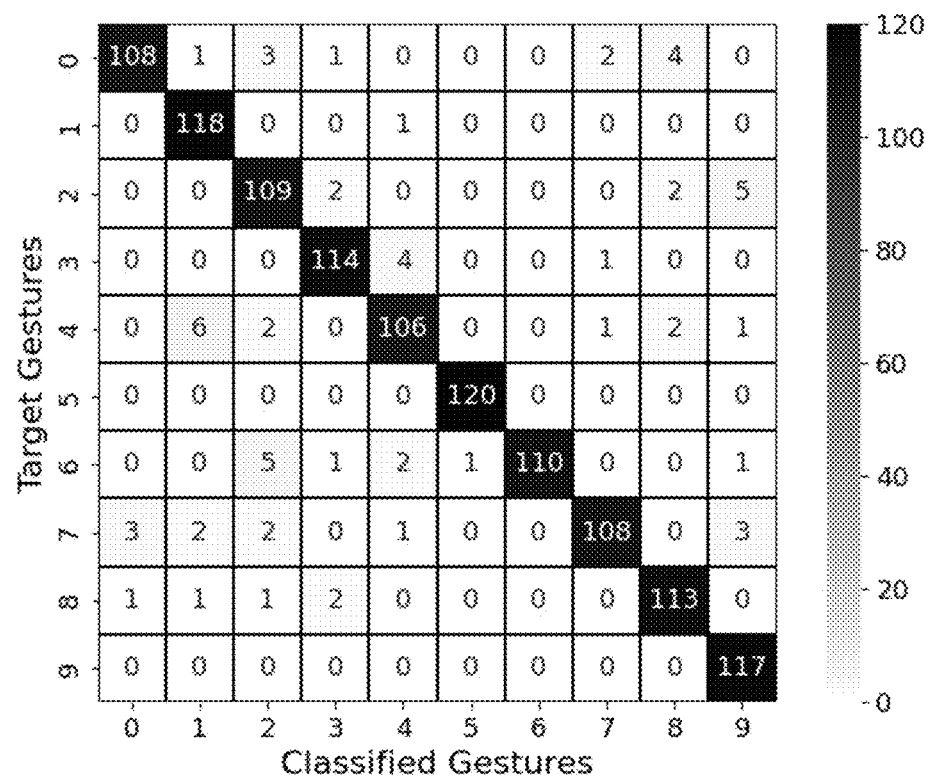
FIG. 8 depicts a confusion matrix for gesture recognition of 10 gestures tested, in accordance with an embodiment of the present disclosure.

Further, the system 100 of the present disclosure was implemented as a gesture recognizer where the user could perform custom-defined gestures while wearing only a smartwatch even while walking around, moving on stairs etc. highly enhancing the practicality of the system, and the system was able to detect the gestures correctly in real time while running on a low-power embedded hardware, well tested on a set of 6 users in varied free-living scenarios. FIG. 8, with reference to FIGS. 1 through 7, depicts a confusion matrix for gesture recognition of 10 gestures tested, in accordance with an embodiment of the present disclosure. Each gesture was performed 120 times. In the confusion matrix depicted in FIG. 8, each diagonal entry shows the number of instances of correct classification of the gestures. Non-diagonal entries show target gesture misclassified as the gesture code on X-axis. A total gesture detection accuracy of 93.6% has been achieved by the system and method of the present disclosure.

Present disclosure provides system and method for leveraging machine learning paradigms using convolution neural network(s) (CNN) for modeling arm motion while air-writing to derive motion information for mini-strokes and create real-time trajectory. The system and method described herein also calibration-free in practice, was shown to provide outputs of air-written shapes in any plane around the subject, even while going on stairs or jogging. The system was shown in light of multiple use cases in a user-independent manner, including a contactless pointing device tested with subjects on the ISO pointing task, and a generic gesture recognition tested in a free-living scenario with subjects drawing gestures even while walking, with the ability of gesture detection with just 1 template per gesture. All of the applications ran in real-time on a computationally constrained Raspberry Pi 3B.

The training of the one or more machine learning models as described herein is achieved by using certain instances of data windows of features derived from motion sensors mapped to certain labels, and the inferencing predicts the labels when presented with such a data window. This is a typical way a machine learning pipeline works. But the system and method of the present disclosure uses this pipeline to perform an estimation of directions for every data window of motion sensing features (representing a mini stroke) constituting the trajectory of the whole movement performed in space, where the ML model is trained on motion data features derived in the pre-processing (e.g., refer steps 202 and 204) from motion data collected while moving the node (wrist, foot, etc.) in straight lines where the labels represent various directions of those straight lines, and when the system 100 is in use, the inferencing by the method uses this model to decide direction for every mini stroke while any shape is drawn in air. This method of training and applying the windowing technique to feature vectors enables the system 100 and the method to calculate the trajectory of movement in real time and provide a high degree of practicality, e.g., ability to calculate trajectories of air-written shapes made even while the user is in motion using only data from motion sensors embedded in the wearable device.

Further, in case of tracking motion while a user is performing air-writing motion in space, it is usually assumed that the torso of the user is stationary, hence the only motion input at the sensing node (e.g., wrist) is owing to the movement which is tracking-relevant for the use case (air-writing movement itself). When the user's torso itself is in motion, e.g., when the user is walking, jogging etc. while the user is performing air-writing simultaneously, a significant external motion starts to add up to the actual air-writing motion, which renders the motion sensing inputs from acceleration sensor unusable for the purpose of tracking arm motion. This is especially true for most prior works (or conventional research works) where accelerometer inputs are key for gravity processing to establish a universal coordinate system, and acceleration is further used to estimate the trajectory. In the system and method of the present disclosure, motion trajectory estimation is performed using a feature-based approach of machine learning, where optionally, acceleration-based features can be reduced in the overall motion feature vectors and more stress on rotational features can be placed to minimize the effect of external acceleration. This can provide a more robust and acceptable tracking input even when there is an external motion.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
acquiring, via one or more hardware processors, a first sensor data and a second sensor data from a first sensor and a second sensor respectively, wherein the first sensor data and the second sensor data are associated with a user;
converting, via the one or more hardware processors, the first sensor data and the second sensor data into a first set of scaled sensor data and a second set of scaled sensor data;
calculating, via the one or more hardware processors, a delta value in a plurality of axis for each sensor value from the second sensor data based on a duration between a current sensor value and a previous sensor value;

generating, via the one or more hardware processors, a Euler Rodriguez matrix based on the calculated delta value in the plurality of axis for each sensor value from the second sensor data;

generating, via the one or more hardware processors, a plurality of feature vectors based on the first set of scaled sensor data, the second set of scaled sensor data, and the Euler Rodriguez matrix;

applying, via the one or more hardware processors, a windowing technique comprising a pre-defined window size on each of the plurality of feature vectors to obtain a plurality of windows, wherein each window amongst the plurality of windows comprises one or more associated feature vectors amongst the plurality of feature vectors; and training, via the one or more hardware processors, one or more machine learning (ML) models based on a label annotated to each window amongst the plurality of windows, wherein the label indicates a stroke direction of data comprised in each window.

2. The processor implemented method of claim 1, further comprising:

continually acquiring in real-time, via the one or more hardware processors, a first test sensor data and a second test sensor data from the first sensor and the second sensor respectively, wherein the first test sensor data and the second test sensor data are associated with the user;

converting in real-time, via the one or more hardware processors, the first test sensor data and the second test sensor data into a first set of scaled test sensor data and a second set of scaled test sensor data;

calculating in real-time, via the one or more hardware processors, a test delta value in the plurality of axis for each sensor value from the second test sensor data based on a duration between a current sensor value and a previous sensor value;

generating in real-time, via the one or more hardware processors, the Euler Rodriguez matrix based on the calculated test delta value in the plurality of axis for each sensor value from the second test sensor data;

obtaining in real-time, via the one or more hardware processors, a set of feature vectors based on the first set of scaled test sensor data, the second set of scaled test sensor data, and the Euler Rodriguez matrix; and iteratively performing, for each subset of feature vectors until a last subset feature vectors amongst the set of feature vectors:

applying in real-time, via the one or more hardware processors, the windowing technique on a current subset of feature vectors amongst the set of feature vectors to obtain a current window;

identifying in real-time, by using the one or more trained machine learning (ML) models via the one or more hardware processors, an associated label for the current window;

calculating in real-time, via the one or more hardware processors, a set of coordinates for the current window based on the associated label, and one or more coordinates associated with a previous window; and tracking in real-time, via the one or more trained ML models, a trajectory for the current window based on the set of coordinates of the current window.

3. The processor implemented method of claim 2, wherein a set of pre-defined initial coordinates are associated with a first window during application of the windowing technique.

4. The processor implemented method of claim 1, wherein the user is in at least one of a first position and a second position.

5. The processor implemented method of claim 1, wherein the first sensor data and the second sensor data are scaled between a first associated pre-defined threshold and a second associated pre-defined threshold to obtain the first set of scaled sensor data and the second set of scaled sensor data.

6. A system, comprising:
a memory storing instructions;
one or more communication interfaces; and
one or more hardware processors coupled to the memory via the one or more communication interfaces, wherein the one or more hardware processors are configured by the instructions to:

acquire a first sensor data and a second sensor data from a first sensor and a second sensor respectively, wherein the first sensor data and the second sensor data are associated with a user;

convert the first sensor data and the second sensor data into a first set of scaled sensor data and a second set of scaled sensor data;

calculate a delta value in a plurality of axis for each sensor value from the second sensor data based on a duration between a current sensor value and a previous sensor value;

generate a Euler Rodriguez matrix based on the calculated delta value in the plurality of axis for each sensor value from the second sensor data;

generate a plurality of feature vectors based on the first set of scaled sensor data, the second set of scaled sensor data, and the Euler Rodriguez matrix;

apply a windowing technique comprising a pre-defined window size on each of the plurality of feature vectors to obtain a plurality of windows, wherein each window amongst the plurality of windows comprises one or more associated feature vectors amongst the plurality of feature vectors; and train one or more machine learning (ML) models based on a label annotated to each window amongst the plurality of windows, wherein the label indicates a stroke direction of data comprised in each window.

7. The system of claim 6, wherein the one or more hardware processors are further configured by the instructions to:

continually acquire in real-time, a first test sensor data and a second test sensor data from the first sensor and the second sensor respectively, wherein the first test sensor data and the second test sensor data are associated with the user;

convert in real-time, the first test sensor data and the second test sensor data into a first set of scaled test sensor data and a second set of scaled test sensor data;

calculate in real-time, a test delta value in the plurality of axis for each sensor value from the second test sensor data based on a duration between a current sensor value and a previous sensor value;

generate in real-time, the Euler Rodriguez matrix based on the calculated test delta value in the plurality of axis for each sensor value from the second test sensor data;

obtain in real-time, a set of feature vectors based on the first set of scaled test sensor data, the second set of scaled test sensor data, and the Euler Rodriguez matrix; and iteratively perform, for each subset of feature vectors until a last subset feature vectors amongst the set of feature vectors:

applying in real-time, the windowing technique on a current subset of feature vectors amongst the set of feature vectors to obtain a current window;

identifying in real-time, by using the one or more trained machine learning (ML) models via the one or more hardware processors, an associated label for the current window;

calculating in real-time, a set of coordinates for the current window based on the associated label, and one or more coordinates associated with a previous window; and tracking in real-time, via the one or more trained ML models, a trajectory for the current window based on the set of coordinates of the current window.

8. The system of claim 7, wherein a set of pre-defined initial coordinates are associated with a first window during application of the windowing technique.

9. The system of claim 6, wherein the user is in at least one of a first position and a second position.

10. The system of claim 6, wherein the first sensor data and the second sensor data are scaled between a first associated pre-defined threshold and a second associated pre-defined threshold to obtain the first set of scaled sensor data and the second set of scaled sensor data.

11. One or more non-transitory computer-readable information storage mediums comprising one or more instructions which when executed by one or more hardware processors cause: acquiring, a first sensor data and a second sensor data from a first sensor and a second sensor respectively, wherein the first sensor data and the second sensor data are associated with a user; converting the first sensor data and the second sensor data into a first set of scaled sensor data and a second set of scaled sensor data; calculating a delta value in a plurality of axis for each sensor value from the second sensor data based on a duration between a current sensor value and a previous sensor value; generating a Euler Rodriguez matrix based on the calculated delta value in the plurality of axis for each sensor value from the second sensor data; generating a plurality of feature vectors based on the first set of scaled sensor data, the second set of scaled sensor data, and the Euler Rodriguez matrix; applying a windowing technique comprising a pre-defined window size on each of the plurality of feature vectors to obtain a plurality of windows, wherein each window amongst the plurality of windows comprises one or more associated feature vectors amongst the plurality of feature vectors; and training one or more machine learning (ML) models based on a label annotated to each window amongst the plurality of windows, wherein the label indicates a stroke direction of data comprised in each window.

12. The one or more non-transitory computer-readable information storage mediums of claim 11, wherein the one or more instructions which when executed by one or more hardware processors further cause: continually acquiring in real-time, a first test sensor data and a second test sensor data from the first sensor and the second sensor respectively, wherein the first test sensor data and the second test sensor data are associated with the user; converting in real-time, the first test sensor data and the second test sensor data into a first set of scaled test sensor data and a second set of scaled test sensor data; calculating in real-time, a test delta value in the plurality of axis for each sensor value from the second test sensor data based on a duration between a current sensor value and a previous sensor value; generating in real-time, the Euler Rodriguez matrix based on the calculated test delta value in the plurality of axis for each sensor value from the second test sensor data; obtaining in real-time, a set of feature vectors based on the first set of scaled test sensor data, the second set of scaled test sensor data, and the Euler Rodriguez matrix; and iteratively performing, for each subset of feature vectors until a last subset feature vectors amongst the set of feature vectors: applying in real-time, the windowing technique on a current subset of feature vectors amongst the set of feature vectors to obtain a current window; identifying in real-time, by using the one or more trained machine learning (ML) models, an associated label for the current window; calculating in real-time, a set of coordinates for the current window based on the associated label, and one or more coordinates associated with a previous window; and tracking in real-time, via the one or more trained ML models, a trajectory for the current window based on the set of coordinates of the current window.

13. The one or more non-transitory computer-readable information storage mediums of claim 12, wherein a set of pre-defined initial coordinates are associated with a first window during application of the windowing technique.

14. The one or more non-transitory computer-readable information storage mediums of claim 11, wherein the user is in at least one of a first position and a second position.

15. The one or more non-transitory computer-readable information storage mediums of claim 11, wherein the first sensor data and the second sensor data are scaled between a first associated pre-defined threshold and a second associated pre-defined threshold to obtain the first set of scaled sensor data and the second set of scaled sensor data.

* * * * *